(12) United States Patent
Huang

(10) Patent No.: US 11,009,680 B2
(45) Date of Patent: May 18, 2021

(54) IRIS LENS ASSEMBLY

(71) Applicant: ZHEJIANG SUNNY OPTICAL CO., LTD, Ningbo (CN)

(72) Inventor: Lin Huang, Ningbo (CN)

(73) Assignee: ZHEJIANG SUNNY OPTICAL CO., LTD

( * ) Notice: Subject to any disclaimer, the term of this patent is extended or adjusted under 35 U.S.C. 154(b) by 20 days.

(21) Appl. No.: 15/780,085

(22) PCT Filed: Sep. 21, 2017

(86) PCT No.: PCT/CN2017/102632
§ 371 (c)(1),
(2) Date: May 30, 2018

(87) PCT Pub. No.: WO2018/196268
PCT Pub. Date: Nov. 1, 2018

(65) Prior Publication Data
US 2021/0072503 A1    Mar. 11, 2021

(30) Foreign Application Priority Data

Apr. 24, 2017  (CN) .......................... 201710273602.8
Apr. 24, 2017  (CN) .......................... 201720433815.8

(51) Int. Cl.
G02B 13/00        (2006.01)
(52) U.S. Cl.
CPC ......... *G02B 13/004* (2013.01); *G02B 13/003* (2013.01); *G02B 13/008* (2013.01); *G02B 13/0035* (2013.01); *G02B 13/0045* (2013.01)

(58) Field of Classification Search
CPC .. G02B 13/004; G02B 13/003; G02B 13/008; G02B 13/0045; G02B 13/0035
See application file for complete search history.

(56) References Cited

U.S. PATENT DOCUMENTS 8,098,441 B2    1/2012  Sasamoto
2016/0092731 A1*  3/2016  Dainty ................ G02B 13/004
                                                    348/78

FOREIGN PATENT DOCUMENTS

| CN | 101324695 A | 12/2008 |
| CN | 101950066 A | 1/2011 |
| CN | 201837770 U | 5/2011 |
| CN | 102213821 A | 10/2011 |
| CN | 202093231 U | 12/2011 |
| CN | 105259636 A | 1/2016 |
| KR | 20090078053 A | 1/2008 |

\* cited by examiner

*Primary Examiner* — Wen Huang
(74) *Attorney, Agent, or Firm* — Barnes & Thornburg LLP

(57) ABSTRACT

The present disclosure discloses an iris lens assembly including, sequentially from an object side to an image side along an optical axis, a first lens and at least one subsequent lens. Wherein an object-side surface of an lens closest to the image side and having optical power among the at least one subsequent lens is a concave surface. The iris lens further includes an optical filter disposed between the object side and the lens closest to the image side and having optical power, and a band-pass wavelength of the optical filter is from 700 nm to 900 nm.

13 Claims, 11 Drawing Sheets

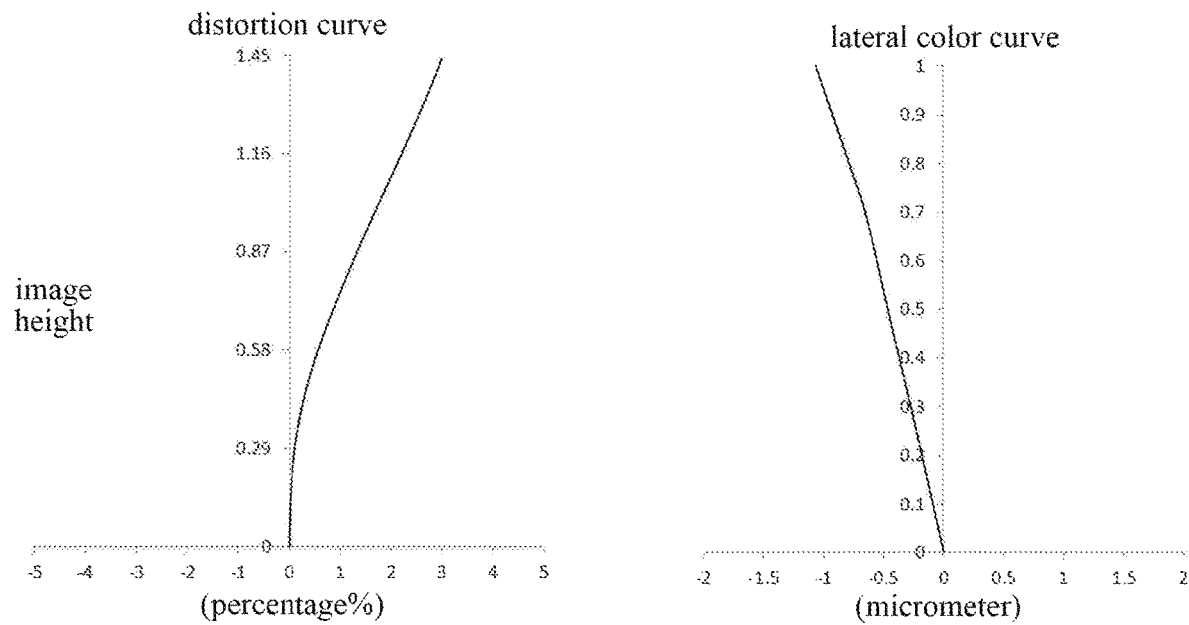
Fig. 2C
Fig. 2D
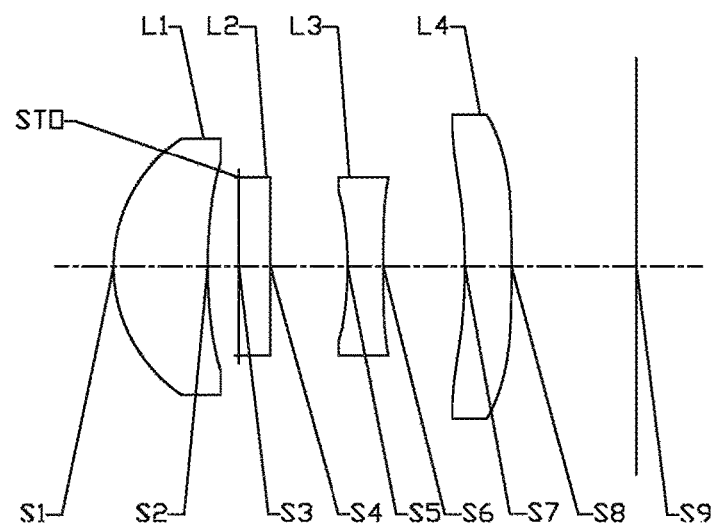
Fig. 3

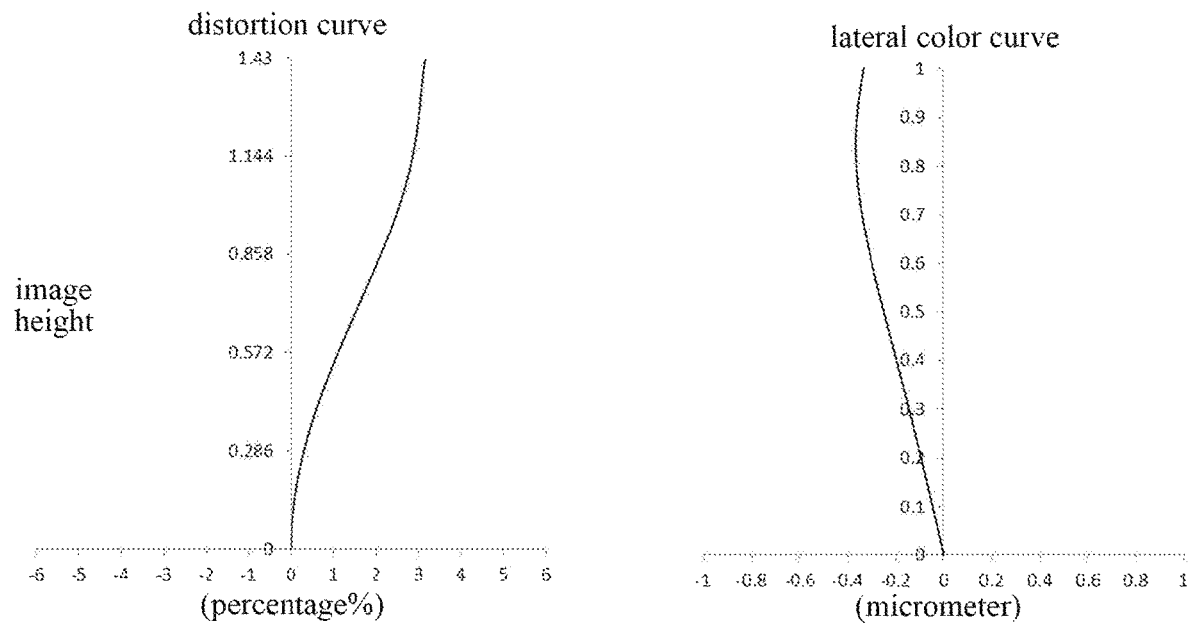
Fig. 6C
Fig. 6D
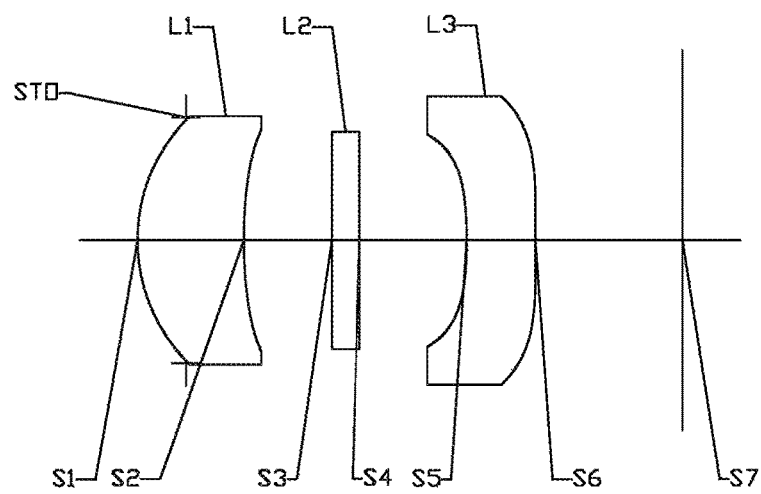
Fig. 7

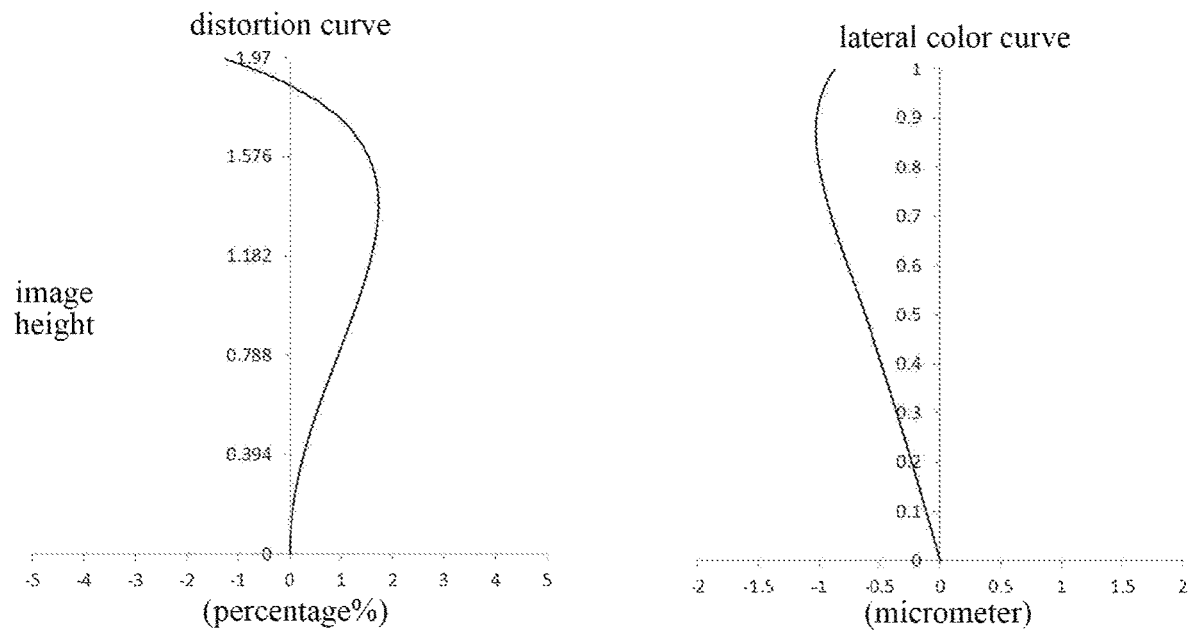
Fig. 10C
Fig. 10D
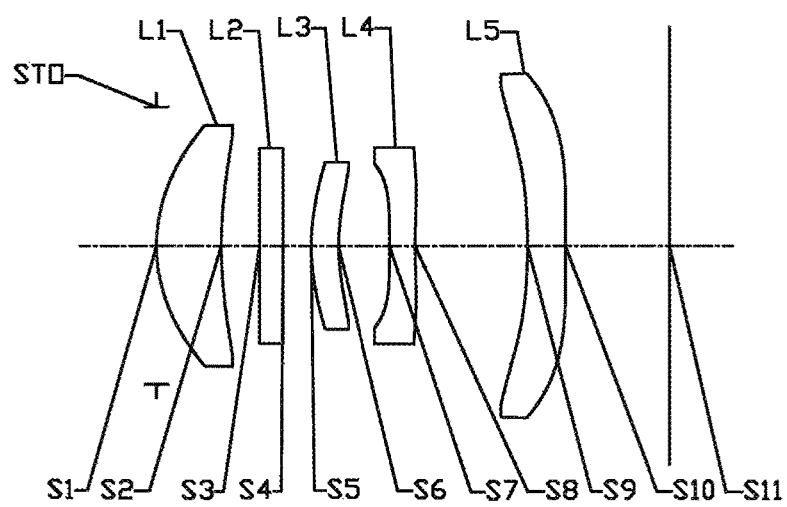
Fig. 11

IRIS LENS ASSEMBLY

CROSS-REFERENCE TO RELATED APPLICATIONS

This application is a U.S. national counterpart application of international application serial No. PCT/CN2017/102632, filed Sep. 21, 2017, which claims priority to Chinese Patent Application Nos. 201710273602.8 and 201720433815.8 both filed Apr. 24, 2017 the disclosures of which are hereby incorporated by reference in their entireties.

TECHNICAL FIELD

The present disclosure relates to an iris lens assembly, specifically to an iris lens assembly including at least two lenses.

BACKGROUND

In recent years, as the science and technology develops, portable electronic products are gradually emerging and portable electronic products with camera functions are increasingly liked. Therefore, the market demand for camera lens assembly applicable to the portable electronic products is gradually increasing. At present, the commonly used photosensitive components for camera lens assembly are CCD (Charge-Coupled Device) or CMOS (Complementary Metal-Oxide Semiconductor). As the semiconductor processing technology improves, the optical systems tend to have higher pixels, and the pixel sizes on the chips become smaller and smaller, which puts forward higher requirements both on the high image quality and the miniaturization of the lenses.

As technologies advance by leaps and bounds, iris recognition technology as one of the biometric technologies is increasingly valued by the market. User identity confirmation is an important part in the information security, both the accuracy and the adaptability to the environment are of extremely importance, thus the requirements on iris recognition technology are raised accordingly. As the disclosure range of the iris recognition technology becomes wider, the lens assemblies used in this technology also need to meet the higher performance requirements, at the same time the production process performance needs to be improved and the interference needs to be reduced.

Accordingly, a miniaturized iris lens assembly with low interference and high image quality is needed.

SUMMARY

The technical solutions provided in the present disclosure solve at least parts of the above-mentioned technical problems.

According to an aspect of the present disclosure, an iris lens assembly including, sequentially from an object side to an image side along an optical axis, a first lens and at least one subsequent lens, is provided. Wherein an object-side surface of a lens closest to the image side and having a refractive power among the at least one subsequent lens is a concave surface; and the iris lens assembly further comprises an optical filter, the optical filter may be disposed between the object side and the lens closest to the image side and having the refractive power, and a band-pass wavelength of the optical filter is from 700 nm to 900 nm.

In one implementation, the above described iris lens assembly further includes an electronic photosensitive component disposed on an image plane, wherein an effective radius DT11 of an object-side surface of the first lens and half of a diagonal length ImgH of an effective pixel area of the electronic photosensitive component, may satisfy: $0.4 < DT11/ImgH < 0.8$.

In one implementation, the first lens may have a positive refractive power, an object-side surface of the first lens may be a convex surface, and an image-side surface of the first lens may be a concave surface.

In one implementation, the lens closest to the image side and having a refractive power may have a negative refractive power.

In one implementation, the at least one subsequent lens includes a second lens disposed between the first lens and the image side. The iris lens assembly may further includes a diaphragm, the diaphragm may be disposed between the object side and the second lens.

In one implementation, an effective focal length f1 of the first lens and a total effective focal length f of the iris lens assembly may satisfy: $0.5 < f1/f < 1$.

In one implementation, $\Sigma CT$ and TTL may satisfy: $0.2 < \Sigma CT/TTL < 0.5$, $\Sigma CT$ being a sum of center thicknesses of the first lens to the lens closest to the image side and having a refractive power on the optical axis, TTL being a distance on the optical axis from the object-side surface of the first lens to the image plane of the iris lens assembly.

In one implementation, a maximum chief ray angle CRAmax of a chief incident ray on the electronic photosensitive component may satisfy: $CRAmax < 32°$.

In one implementation, a distance TTL on the optical axis from the object-side surface of the first lens to the image plane of the iris lens assembly, and the total effective focal length f of the iris lens assembly may satisfy: $TTL/f < 1$.

With the iris lens assembly configured as above, at least one of the beneficial effects such as miniaturization, low interference, high image quality, low sensitivity and high recognition precision can be achieved.

BRIEF DESCRIPTION OF THE DRAWINGS

The above and other advantages of the implementations according to the present disclosure will become apparent through detailed description given with reference to accompanying drawings, and the accompanying drawings are intended to illustrate exemplary implementations of the present disclosure, rather than a limitation to the exemplary implementations of the present disclosure. In the drawings:

FIG. 2C illustrates a distortion curve of the iris lens assembly according to embodiment 1;

FIG. 2D illustrates a lateral color curve of the iris lens assembly according to embodiment 1;

FIG. 3 is a schematic structural view of an iris lens assembly according to embodiment 2 of the present disclosure;

FIG. 6C illustrates a distortion curve of the iris lens assembly according to embodiment 3;

FIG. 6D illustrates a lateral color curve of the iris lens assembly according to embodiment 3;

FIG. 7 is a schematic structural view of an iris lens assembly according to embodiment 4 of the present disclosure;

FIG. 10C illustrates a distortion curve of the iris lens assembly according to embodiment 5;

FIG. 10D illustrates a lateral color curve of the iris lens assembly according to embodiment 5;

FIG. 11 is a schematic structural view of an iris lens assembly according to embodiment 6 of the present disclosure;

DETAILED DESCRIPTION OF EMBODIMENTS

Figure 1:
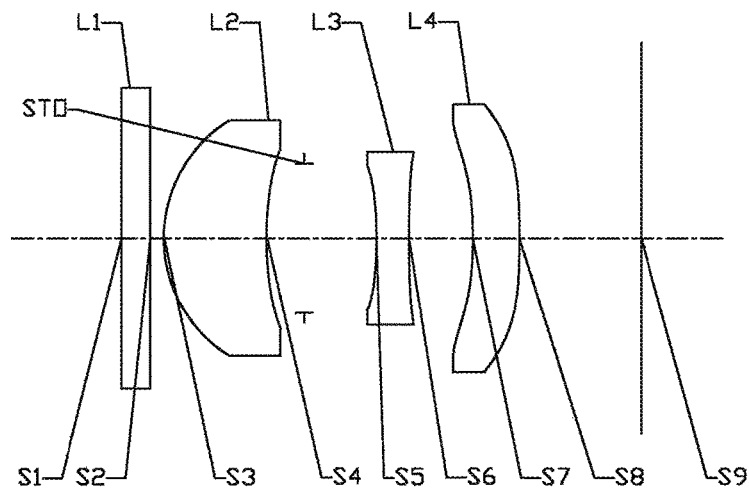
FIG. 1 is a schematic structural view of an iris lens assembly according to embodiment 1 of the present disclosure.

For a better understanding of the present disclosure, various aspects of the present disclosure will be described in more detail with reference to the drawings. It should be understood that, these detailed descriptions are merely used for describing exemplary embodiments of the present disclosure, but not in any way for limiting the scope of the present disclosure. Throughout the specification, the same reference numerals designate the same elements. The expression "and/or" includes any and all combinations of one or more of the associated listed items.

It should be noted that, in the present specification, the expressions such as first and second are merely for distinguishing one feature from another feature without indicating any limitation on the features. Thus, a first lens discussed below could be referred to as a second lens without departing from the teachings of the present disclosure.

In the accompanying drawings, for convenience of the description, thicknesses, sizes and shapes of lenses have been slightly exaggerated. Specifically, spherical or aspheric shapes shown in the accompanying drawings are shown as examples. That is, spherical or aspheric shapes are not limited to the spherical or aspheric shapes shown in the accompanying drawings. The accompanying drawings are merely examples, not strictly drawn to scale.

It should be further understood that the terms "comprising," "including," "having", "containing" and/or "contain", when used in the specification, specify the presence of stated features, unities, steps, operations, elements and/or components, but do not exclude the presence or addition of one or more other features, unities, steps, operations, elements, components and/or combinations thereof. In addition, expressions, such as "at least one of," when preceding a list of features, modify the entire list of features rather than an individual element in the list. Further, the use of "may", when describing implementations of the present disclosure, refers to "one or more implementations of the present disclosure." Also, the term "exemplary" is intended to refer to an example or illustration.

As used herein, the terms "substantially," "about" and similar terms are used as terms of approximation and not as terms indicating degree, and are intended to describe the inherent deviations of a measurement value or a calculation values that would be recognized by those of ordinary skill in the art.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments.

The present disclosure will be further described below in combination with specific embodiments.

An iris lens assembly according to exemplary implementations of the present disclosure includes, sequentially from an object side to an image side along an optical axis: a first lens and at least one subsequent lens. Wherein an object-side surface of a lens closest to the image side and having a refractive power among the at least one subsequent lens may be a concave surface.

Alternatively, the iris lens assembly may include an optical filter for correcting color deviation, the optical filter may be disposed between the object side and the lens closest to the image side and having a refractive power. By arranging the optical filter at a certain location between the object side and the first lens or between the object side and the lens closest to the image side and having the refractive power, the effect of reducing the incident angle of the filter ray is achieved, and the drift of the film system at an incident angle of the peripheral field-of-view is reduced, so as to reduce the bandwidth of the film system, and reduce the interference.

In use, a band-pass wavelength of the optical filter of the iris lens assembly is from about 700 nm to about 900 nm, to realize the effective recognition function of the iris lens assembly.

In the exemplary implementations, the first lens may have a positive refractive power, its object-side surface may be a convex surface, and its image-side surface may be a concave surface. The lens closest to the image side and having the refractive power may have a negative refractive power. By reasonably arranging refractive power of each lens, the recognizing precision of the iris lens assembly is ensured while high image quality is realized.

The at least one subsequent lens may include a second lens disposed between the first lens and the image side. The iris lens assembly may further comprise a diaphragm for limiting light. The diaphragm may be disposed between the object side and the second lens to reduce the chief ray angle, and improve the image quality of the iris lens assembly. It should be understood by the one skilled in the art that, the disposition of the diaphragm should not be limited to the locations shown in the accompanying drawings, that is, the diaphragm may be disposed at other locations between the object side and the second lens as needed.

The iris lens further comprises an electronic photosensitive component disposed on an image plane. An effective radius $DT11$ of an object-side surface of the first lens and half of a diagonal length $ImgH$ of an effective pixel area of the electronic photosensitive component may satisfy $0.4<DT11/ImgH<0.8$. More specifically, $DT11$ and $ImgH$ may further satisfy $0.550 \leq DT11/ImgH \leq 0.652$. By reasonably arranging the effective radius $DT11$ of the object-side surface of the first lens and half of the diagonal length $ImgH$ of an effective pixel area of the electronic photosensitive component, the miniaturization of the lens assembly is achieved.

An effective focal length $f1$ of the first lens and a total effective focal length $f$ of the iris lens assembly may satisfy $0.5<f1/f<1$, more specifically, $f1$ and $f$ may further satisfy $0.646 \leq f1/f \leq 0.808$. By reasonably arranging the refractive power of the first lens, the recognizing precision of the iris lens assembly is ensured while the miniaturization is achieved.

$\Sigma CT$ and $TTL$ may satisfy $0.2<\Sigma CT/TTL<0.5$, $\Sigma CT$ being a sum of center thicknesses of the first lens to the lens that is closest to the image side and has a refractive power on the optical axis, $TTL$ being a distance on the optical axis from the object-side surface of the first lens to the image plane of the iris lens assembly. More specifically, $\Sigma CT$ and $TTL$ may further satisfy $0.292 \leq \Sigma CT/TTL \leq 0.380$. By reasonably arranging the center thickness of each lens and the total track length of the iris lens assembly, it is conducive to shortening overall length of the iris lens module; at the same time, the increase of spacing distance between lenses is conducive to reducing the tolerance sensitivity of system and improving the quality and consistency of the mass-produced lens assemblies.

A distance $TTL$ on the optical axis from the object-side surface of the first lens to the image plane of the iris lens assembly, and a total effective focal length $f$ of the iris lens assembly may satisfy $TTL/f<1$, more specifically, $TTL$ and $f$ may further satisfy $0.875 \leq TTL/f \leq 0.947$. When the iris lens assembly satisfies $TTL/f<1$, the recognizing precision can be ensured while the miniaturization of lens assembly is achieved. At the same time, the lens assembly can maintain a longer focal length while have a wider depth of focus.

In order to effectively reduce the drift, at an incident angle of the peripheral field, due to the film system, to reduce the bandwidth of the film system, so as to reduce the interference, the maximum incident angle of the chief incident ray on the electronically sensitive component may also be optimized. For example, a maximum incident angle $CRAmax$ of the chief incident ray on the electronic photosensitive component may satisfy $CRAmax<32°$, more specifically, $CRAmax$ may further satisfy $23.676° \leq CRAmax \leq 30.334°$. Such a configuration can also effectively boost the photosensitive efficiency of the rays entering the chip, thereby the recognizing effect of the iris lens is enhanced.

The iris lens assembly according to the above implementations of the present disclosure may include multiple lenses. By reasonably allocating, such as, the refractive powers and surface forms of respective lenses, the center thicknesses of respective lenses, and the axial spacing distances between respective lenses, the interference can be effectively reduced, the miniaturization of the lens assembly can be ensured and the image quality can be improved, so that the iris lens assembly is more conducive to production and processing and can be applied to portable electronic products. In the implementations of the present disclosure, at least one of mirror surfaces of respective lenses is an aspheric mirror surface. An aspheric lens is characterized in that its curvature continuously changes from the lens center to the periphery. In contrast to that a spherical lens having a certain curvature from the lens center to the periphery, the aspheric lens has a better radius of curvature characteristic and advantages of reducing the distortion aberration and the astigmatism aberration, and can make the field of view wider and realer. The use of the aspheric lens can eliminate as much as possible the aberration that occurs during imaging, thereby improving the image quality. Additionally, the use of the aspheric lens can effectively reduce the number of lenses in the optical system.

However, it should be understood by those skilled in the art that, in a situation without departing from the technical solution sought to be protected by the present disclosure, the number of lenses forming the lens assembly may be changed, to obtain various results and advantages described beneath. For instance, in the description of the first embodiment, an iris lens assembly having three lenses is described as an example, but the iris lens assembly is not limited to including three lenses. If necessary, the iris lens assembly may also include other numbers of lenses.

Specific embodiments applicable to the iris lens assembly of the above implementations will be further described below with reference to the accompanying drawings.

Embodiment 1

An iris lens assembly according to embodiment 1 of the present disclosure is described below with reference to FIG.

1 to FIG. 2D. FIG. 1 shows a schematic structural view of the iris lens assembly according to embodiment 1 of the present disclosure.

As shown in FIG. 1, the iris lens assembly includes, sequentially from an object side to an image side along an optical axis: an optical filter L1 having an object-side surface S1 and an image-side surface S2; a first lens L2 having an object-side surface S3 and an image-side surface S4; a diaphragm STO; a second lens L3 having an object-side surface S5 and an image-side surface S6; and a third lens L4 having an object-side surface S7 and an image-side surface S8. Alternatively, a band-pass wavelength of the optical filter L1 is from about 700 nm to about 900 nm. Light from an object passes through the surfaces S1 to S8 sequentially and is finally imaged on the image plane S9.

Table 1 shows half of the diagonal length ImgH of an effective pixel area on the image plane S9 of the iris lens assembly, the total effective focal length f of the iris lens assembly, effective focal lengths f1 to f3 of each lens and the distance TTL from the object-side surface S3 of the first lens L2 to the image plane S9 on the optical axis of the iris lens assembly in embodiment 1.

TABLE 1

| Parameter | ImgH (mm) | f (mm) | f1 (mm) | f2 (mm) | f3 (mm) | TTL (mm) |
|---|---|---|---|---|---|---|
| Value | 1.445 | 4.024 | 2.665 | −4.428 | −9.183 | 3.520 |

According to Table 1, the effective focal lengths f1 of the first lens L2, and the total effective focal length f of the iris lens assembly satisfy f1/f=0.662. The distance TTL from the object-side surface S3 of the first lens L2 to the image plane S9 of the iris lens assembly on the optical axis, and the total effective focal length f of the iris lens assembly satisfy TTL/f=0.875.

Table 2 shows surface type, radius of curvature, thickness, material and conic coefficient of each lens of the iris lens assembly in embodiment 1, wherein the units for the radius of curvature and the thickness are millimeter (mm).

According to Table 2, ΣCT and TTL satisfy ΣCT/TTL=0.380, ΣCT being a sum of the center thicknesses of the first lens L2 to the third lens on the optical axis, TTL being the distance on the optical axis from the object-side surface S3 of the first lens L2 to the image plane S9 of the iris lens assembly.

The present embodiment adopts three lenses as an example, by reasonably arranging the focal length and surface type of each lens, an overall length of the iris lens assembly is shortened, the interference is reduced, miniaturization and low interference of the iris lens assembly are ensured; concurrently, various aberrations are corrected, and resolution and image quality of the lens assembly are improved. The surface shape of each aspheric surface x is defined by the following formula:

$$x = \frac{ch^2}{1+\sqrt{1-(k+1)c^2h^2}} + \sum A_i h^i \quad (1)$$

Here, x is the sag—the axis-component of the displacement of the surface from the aspheric vertex, when the surface is at height h from the optical axis; c is the paraxial curvature of the aspheric surface, c=1/R (that is, the paraxial curvature c is reciprocal of the curvature radius in the above Table 2); k is the conic coefficient (given in the above Table 2); Ai is a correction coefficient for the i-th order of the aspheric surface. Table 3 below shows high-order coefficients $A_4$, $A_6$, $A_8$, $A_{10}$, $A_{12}$, $A_{16}$, $A_{18}$ and $A_{20}$ applicable to each aspheric surface S3-S8 in embodiment 1.

TABLE 2

| Surface number | Surface type | Radius of curvature | Thickness | Material Refractive index | Abbe number | Conic coefficient |
|---|---|---|---|---|---|---|
| OBJ | spherical | infinite | 260.0000 | | | |
| S1 | spherical | infinite | 0.2100 | 1.517 | 64.17 | |
| S2 | spherical | infinite | 0.1000 | | | |
| S3 | aspheric | 1.0136 | 0.7559 | 1.528 | 55.78 | −0.1064 |
| S4 | aspheric | 2.6862 | 0.2779 | | | 10.4671 |
| STO | spherical | infinite | 0.5358 | | | |
| S5 | aspheric | −3.6921 | 0.2400 | 1.622 | 23.53 | −5.9313 |
| S6 | aspheric | 11.1091 | 0.4699 | | | 49.9667 |
| S7 | aspheric | −3.4230 | 0.3422 | 1.528 | 55.78 | 2.1508 |
| S8 | aspheric | −12.0286 | 0.8984 | | | 34.4697 |
| S9 | spherical | infinite | | | | |

TABLE 3

| Surface number | A4 | A6 | A8 | A10 | A12 | A14 | A16 | A18 | A20 |
|---|---|---|---|---|---|---|---|---|---|
| S3 | −2.8264E−03 | 2.0686E−03 | 1.6650E−01 | −1.4644E+00 | 6.4296E+00 | −1.5646E+01 | 2.1962E+01 | −1.6641E+01 | 5.3510E+00 |
| S4 | −6.6032E−03 | 2.5550E−02 | −5.4834E−01 | 3.6846E+00 | −1.3456E+01 | 2.7668E+01 | −3.1320E+01 | 1.8177E+01 | −4.2236E+00 |
| S5 | −2.8442E−01 | −2.3426E−02 | 3.6454E+00 | −8.6486E+01 | 8.1366E+02 | −4.4150E+03 | 1.3783E+04 | −2.2995E+04 | 1.5730E+04 |
| S6 | −5.3076E−02 | 1.5183E+00 | −1.6173E+01 | 1.3901E+02 | −7.8614E+02 | /8353E+03 | −6.2653E+03 | 7.7087E+03 | −4.0408E+03 |
| S7 | −3.9963E−01 | 1.0384E+00 | −2.9132E+00 | 7.8980E+00 | −1.4305E+01 | 1.7128E+01 | −1.2699E+01 | 5.0750E+00 | −8.1673E−01 |
| S8 | −4.2707E−01 | 8.2686E−01 | −2.5126E+00 | 6.1063E+00 | −1.0568E+01 | 1.2298E+01 | −9.1014E+00 | 3.8622E+00 | −7.0493E−01 |

In the present embodiment, DT11 and ImgH satisfy DT11/ImgH=0.602, DT11 being an effective radius of the object-side surface S3 of the first lens L2, ImgH being half of a diagonal length of an effective pixel area of the image plane S9 of the iris lens assembly. A maximum chief ray angle of the chef incident ray on the electronic photosensitive component CRAmax=30.334°.

Figures 2A, 2B:
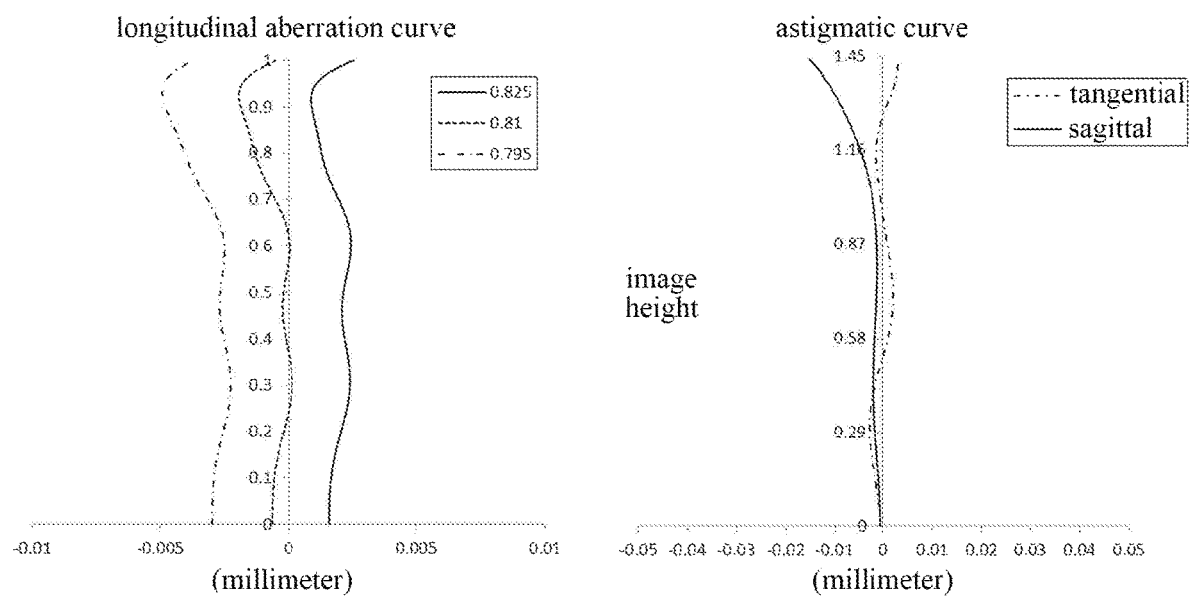
FIG. 2A illustrates a longitudinal aberration curve of the iris lens assembly according to embodiment 1.
FIG. 2B illustrates an astigmatism curve of the iris lens assembly according to embodiment 1.

FIG. 2A illustrates a longitudinal aberration curve of the iris lens assembly according to embodiment 1, representing deviations of focal points converged by light of different wavelengths after passing through the iris lens assembly. FIG. 2B illustrates an astigmatism curve of the iris lens assembly according to embodiment 1, representing a curvature of a tangential plane and a curvature of a sagittal plane. FIG. 2C illustrates a distortion curve of the iris lens assembly according to embodiment 1, representing amounts of distortion at different viewing angles. FIG. 2D illustrates a lateral color curve of the iris lens assembly according to embodiment 1, representing deviations of different image heights on an image plane after light passes through the iris lens assembly. It can be seen from FIG. 2A to FIG. 2D that the iris lens assembly provided in Embodiment 1 can achieve good image quality.

Embodiment 2

An iris lens assembly according to embodiment 2 of the present disclosure is described below with reference to FIG. 3 to FIG. 4D. In this embodiment and the following embodiments, for the purpose of brevity, the description of parts similar to those in embodiment 1 will be omitted. FIG. 3 is a schematic structural view of the iris lens assembly according to embodiment 2.

As shown in FIG. 3, the iris lens assembly includes, sequentially from an object side to an image side along an optical axis: a first lens L1 having an object-side surface S1 and an image-side surface S2; a diaphragm STO; an optical filter L2 having an object-side surface S3 and an image-side surface S4; a second lens L3 having an object-side surface S5 and an image-side surface S6; and a third lens L4 having an object-side surface S7 and an image-side surface S8. Alternatively, a band-pass wavelength of the optical filter L2 is from about 700 nm to about 900 nm. Light from an object passes through the surfaces S1 to S8 sequentially and is finally imaged on the image plane S9.

Table 4 shows half of a diagonal length ImgH of an effective pixel area on the image plane S9 of the iris lens assembly, a total effective focal length f of the iris lens assembly, effective focal lengths f1 to f3 of each lenses and a distance TTL on the optical axis from the object-side surface S1 of the first lens L1 to the image plane S9 of the iris lens assembly in embodiment 2. Table 5 shows the surface type, the radius of curvature, the thickness, material and the conic coefficient of each lens of the iris lens assembly in embodiment 2, wherein the units for the radius of curvature and the thickness are both millimeter (mm). Table 6 shows the high-order coefficients $A_4$, $A_6$, $A_8$, $A_{10}$, $A_{12}$, $A_{16}$, $A_{18}$ and $A_{20}$ applicable to each aspheric surface in embodiment 2. Wherein the surface shape of each aspheric surface can be defined by the formula (1) given in the above embodiment 1.

TABLE 4

| Parameter | ImgH (mm) | f (mm) | f1 (mm) | f2 (mm) | f3 (mm) | TTL (mm) |
|---|---|---|---|---|---|---|
| Value | 1.400 | 3.935 | 2.544 | −4.016 | −8.929 | 3.511 |

TABLE 5

| Surface number | Surface type | Radius of curvature | Thickness | Material Refractive index | Material Abbe number | Conic coefficient |
|---|---|---|---|---|---|---|
| OBJ | spherical | infinite | 260.0000 | | | |
| S1 | aspheric | 1.0309 | 0.6305 | 1.528 | 55.78 | −0.1653 |
| S2 | aspheric | 3.4919 | 0.2097 | | | 11.8292 |
| STO | spherical | infinite | 0.0000 | | | |
| S3 | spherical | infinite | 0.2100 | 1.517 | 64.17 | |
| S4 | spherical | infinite | 0.5222 | | | |
| S5 | aspheric | −2.5620 | 0.2400 | 1.622 | 23.53 | −78.0485 |
| S6 | aspheric | 103.6107 | 0.5449 | | | −99.0000 |
| S7 | aspheric | −3.4230 | 0.3127 | 1.528 | 55.78 | 2.2864 |
| S8 | aspheric | −12.0286 | 0.8408 | | | 50.0000 |
| S9 | spherical | infinite | | | | |

TABLE 6

| Surface number | A4 | A6 | A8 | A10 | A12 | A14 | A16 | A18 | A20 |
|---|---|---|---|---|---|---|---|---|---|
| S1 | 6.5992E−03 | 1.5438E−02 | 1.0245E−02 | −2.4170E−01 | 2.0091E+00 | −6.8823E+00 | 1.2595E+01 | −1.1856E+01 | 4.6323E+00 |
| S2 | 1.0286E−02 | 3.6291E−02 | −5.1644E−01 | 4.6049E+00 | −2.2457E+01 | 6.5971E+01 | −1.1420E+02 | 1.0787E+02 | −4.2208E+01 |
| S5 | −6.4013E−01 | 3.6958E+00 | −4.1356E+01 | 4.3474E+02 | −3.6334E+03 | 2.0685E+04 | −7.4297E+04 | 1.5073E+05 | −1.3124E+05 |
| S6 | 2.4562E−01 | 7.1315E−01 | −1.0739E+01 | 1.0515E+02 | −6.8092E+02 | /8240E+03 | −7.2470E+03 | 1.0480E+04 | −6.5353E+03 |
| S7 | −1.8741E−01 | 9.5734E−01 | −4.5101E+00 | 1.7443E+01 | −4.4731E+01 | 7.4097E+01 | −7.6341E+01 | 4.4498E+01 | −1.1235E+01 |
| S8 | −2.7645E−01 | 6.3372E−01 | −2.3439E+00 | 6.4622E+00 | −1.2227E+01 | 1.5422E+01 | −1.2453E+01 | 5.8568E+00 | −1.2243E+00 |

Figure 4A:
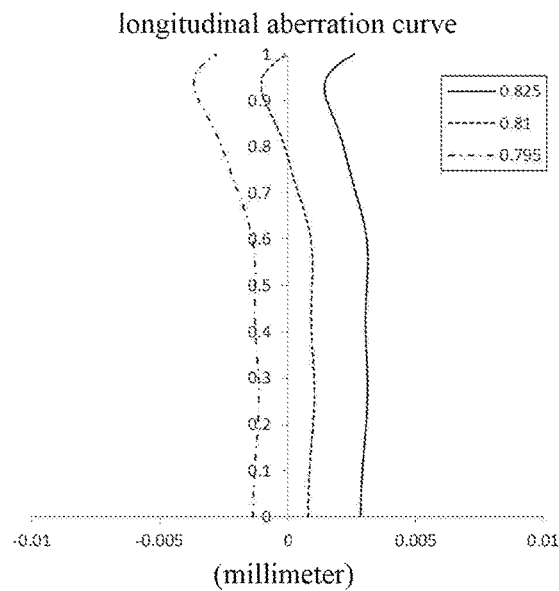
FIG. 4A illustrates a longitudinal aberration curve of the iris lens assembly according to embodiment 2.
Figure 4B:
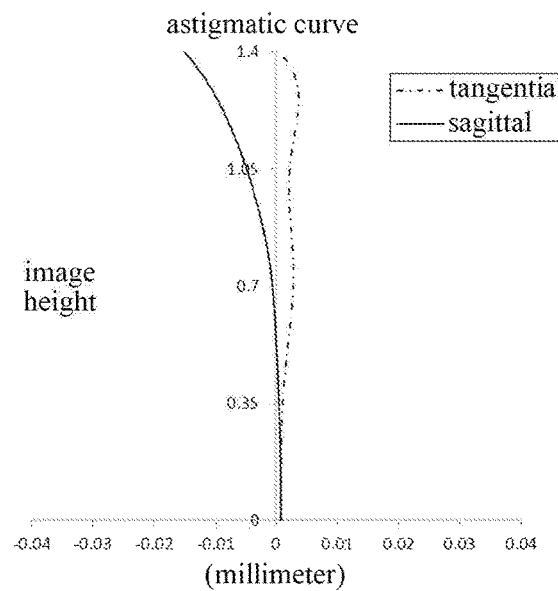
FIG. 4B illustrates an astigmatism curve of the iris lens assembly according to embodiment 2.
Figure 4C:
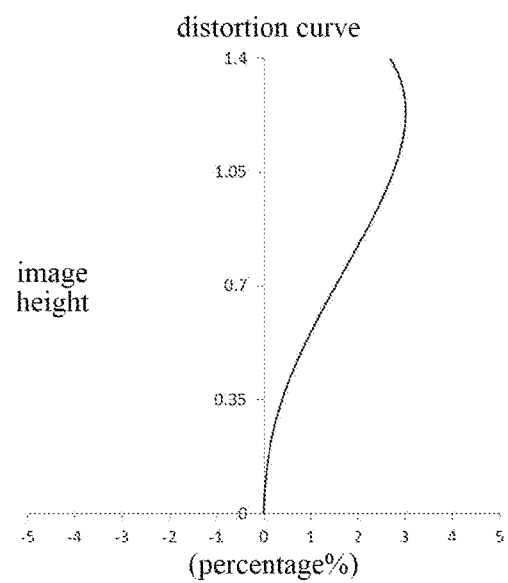
FIG. 4C illustrates a distortion curve of the iris lens assembly according to embodiment 2.
Figure 4D:
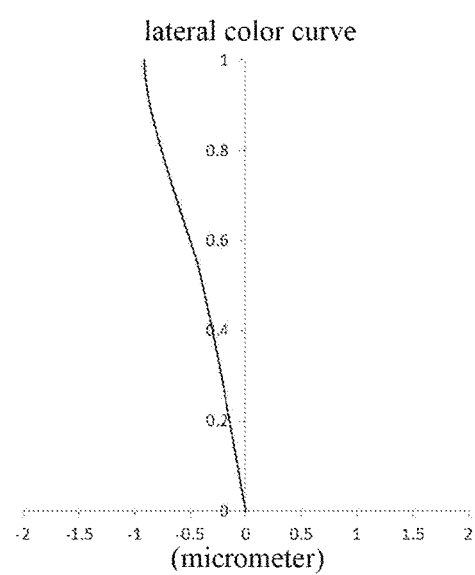
FIG. 4D illustrates a lateral color curve of the iris lens assembly according to embodiment 2.

FIG. 4A illustrates a longitudinal aberration curve of the iris lens assembly according to embodiment 2, representing deviations of focal points converged by light of different wavelengths after passing through the iris lens assembly. FIG. 4B illustrates an astigmatism curve of the iris lens assembly according to embodiment 2, representing a curvature of a tangential plane and a curvature of a sagittal plane. FIG. 4C illustrates a distortion curve of the iris lens assembly according to embodiment 2, representing amounts of distortion at different viewing angles. FIG. 4D illustrates a lateral color curve of the iris lens assembly according to embodiment 2, representing deviations of different image heights on an image plane after light passes through the iris lens assembly. It can be seen from FIG. 4A to FIG. 4D that the iris lens assembly provided in embodiment 2 can achieve good image quality.

Embodiment 3

Figure 5:
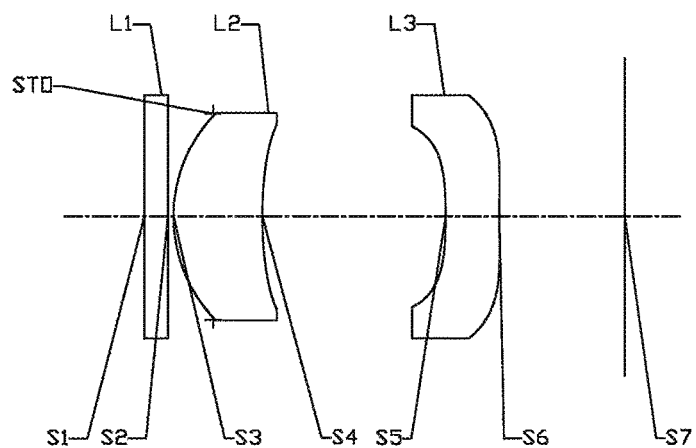
FIG. 5 is a schematic structural view of an iris lens assembly according to embodiment 3 of the present disclosure.

An iris lens assembly according to embodiment 3 of the present disclosure is described below with reference to FIG. 5 to FIG. 6D. FIG. 5 shows a schematic structural view of the iris lens assembly according to embodiment 3.

As shown in FIG. 5, the iris lens assembly includes, sequentially from an object side to an image side along an optical axis: an optical filter L1 having an object-side surface S1 and an image-side surface S2; a diaphragm STO; a first lens L2 having an object-side surface S3 and an image-side surface S4; and a second lens L3 having an object-side surface S5 and an image-side surface S6. Alternatively, a band-pass wavelength of the optical filter L1 is from about 700 nm to about 900 nm. Light from an object passes through the surfaces S1 to S6 sequentially and is finally imaged on the image plane S7.

Table 7 shows half of a diagonal length ImgH of an effective pixel area on the image plane S7 of the iris lens assembly, a total effective focal length f of the iris lens assembly, an effective focal length f1 of the first lens L2, an effective focal length f2 of the second lens L3, and a distance TTL on the optical axis from the object-side surface S3 of the first lens L2 to the image plane S7 of the iris lens assembly. Table 8 shows surface type, radius of curvature, thickness, material and conic coefficient of each lens of the iris lens assembly in embodiment 3, wherein the units of the radius of curvature and the thickness are both millimeter (mm). Table 9 shows the high-order coefficients $A_4$, $A_6$, $A_8$, $A_{10}$, $A_{12}$, $A_{14}$ and $A_{16}$ applicable to each aspheric surface in embodiment 3. Wherein the surface shape of each aspheric surface can be defined by the formula (1) given in the above embodiment 1.

TABLE 7

| | Parameter | | | | |
|---|---|---|---|---|---|
| | ImgH (mm) | f (mm) | f1 (mm) | f2 (mm) | TTL (mm) |
| Value | 1.425 | 4.300 | 3.468 | −5.299 | 4.026 |

TABLE 8

| Surface number | Surface type | Radius of curvature | Thickness | Material | | Conic coefficient |
|---|---|---|---|---|---|---|
| | | | | Refractive index | Abbe number | |
| OBJ | spherical | infinite | 260.0000 | | | |
| S1 | spherical | infinite | 0.2100 | 1.516 | 58.57 | |
| S2 | spherical | infinite | 0.4027 | | | |
| STO | spherical | infinite | −0.3527 | | | |
| S3 | aspheric | 1.3286 | 0.7905 | 1.537 | 56.11 | 0.5907 |
| S4 | aspheric | 3.6753 | 1.6364 | | | −93.9573 |
| S5 | aspheric | −4.7299 | 0.4781 | 1.622 | 23.53 | 1.0000 |
| S6 | aspheric | 11.2549 | 1.1212 | | | −99.0000 |
| S7 | spherical | infinite | | | | |

TABLE 9

| Surface number | A4 | A6 | A8 | A10 | A12 | A14 | A16 |
|---|---|---|---|---|---|---|---|
| S3 | −2.6866E−02 | −1.0060E−01 | 3.3323E−01 | −7.5091E−01 | 7.7292E−01 | −3.3530E−01 | 0.0000E+00 |
| S4 | 2.5929E−01 | −5.4325E−01 | 1.2616E+00 | −1.7981E+00 | 1.4529E+00 | −4.3921E−01 | 0.0000E+00 |
| S5 | −3.2181E−01 | −2.0391E−01 | 6.4304E−02 | 6.9143E−01 | −3.6078E+00 | 4.9395E+00 | −2.9799E+00 |
| S6 | −2.0839E−01 | −5.3285E−02 | 2.0902E−01 | −3.5146E−01 | 2.9360E−01 | −1.3678E−01 | 2.7386E−02 |

Figures 6A, 6B:
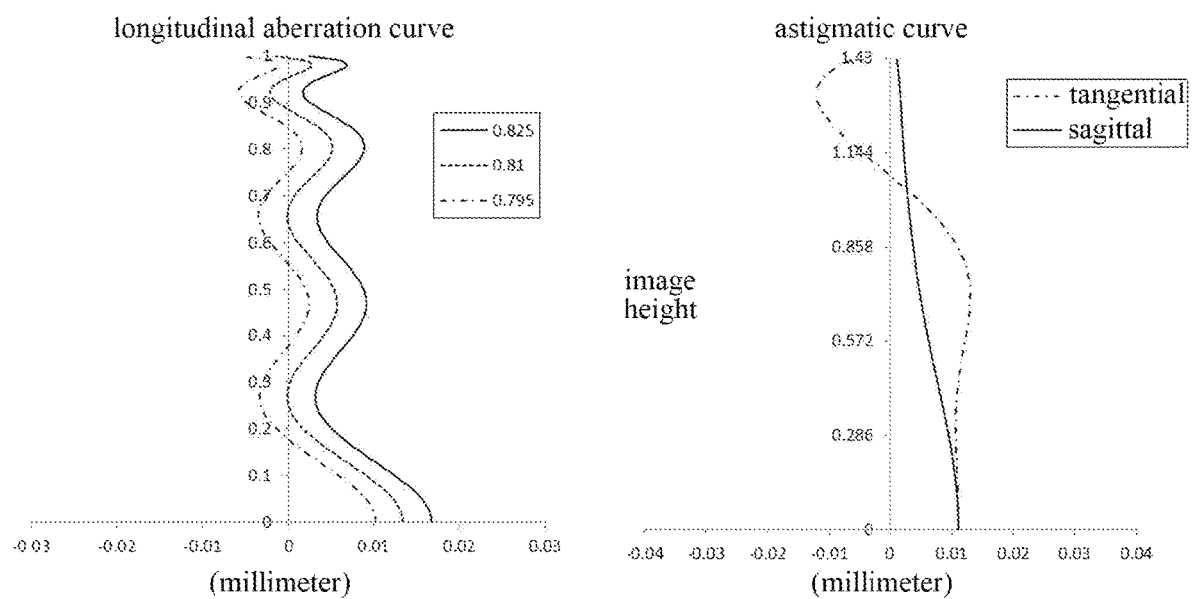
FIG. 6A illustrates a longitudinal aberration curve of the iris lens assembly according to embodiment 3.
FIG. 6B illustrates an astigmatism curve of the iris lens assembly according to embodiment 3.

FIG. 6A illustrates a longitudinal aberration curve of the iris lens assembly according to embodiment 3, representing deviations of focal points converged by light of different wavelengths after passing through the iris lens assembly. FIG. 6B illustrates an astigmatism curve of the iris lens assembly according to embodiment 3, representing a curvature of a tangential plane and a curvature of a sagittal plane. FIG. 6C illustrates a distortion curve of the iris lens assembly according to embodiment 3, representing amounts of distortion at different viewing angles. FIG. 6D illustrates a lateral color curve of the iris lens assembly according to embodiment 3, representing deviations of different image heights on an image plane after light passes through the iris lens assembly. It can be seen from FIG. 6A to FIG. 6D that the iris lens assembly provided in embodiment 3 can achieve good image quality.

Embodiment 4

An iris lens assembly according to embodiment 4 of the present disclosure is described below with reference to FIG. 7 to FIG. 8D. FIG. 7 shows a schematic structural view of the iris lens assembly according to embodiment 4.

As shown in FIG. 7, the iris lens assembly includes, sequentially from an object side to an image side along an optical axis: a diaphragm STO; a first lens L1 having an object-side surface S1 and an image-side surface S2; an optical filter L2 having an object-side surface S3 and an image-side surface S4; and a second lens L3 having an object-side surface S5 and an image-side surface S6. Alternatively, a band-pass wavelength of the optical filter L2 is from about 700 nm to about 900 nm. Light from an object passes through the respective surfaces S1 to S6 sequentially and is finally imaged on the image plane S7.

Table 10 shows half of a diagonal length ImgH of an effective pixel area of the image plane S7 of the iris lens assembly, a total effective focal length f of the iris lens assembly, an effective focal length f1 of the first lens L1, an effective focal length f2 of the second lens L3, and a distance TTL on the optical axis from the object-side surface S1 of the first lens L1 to the image plane S7 of the iris lens assembly. Table 11 shows surface type, radius of curvature, thickness, material and conic coefficient of each lens of the iris lens assembly in embodiment 4, wherein the units of the radius of curvature and the thickness are both millimeter (mm). Table 12 shows the high-order coefficients $A_4, A_6, A_8, A_{10}, A_{12}, A_{14}$ and $A_{16}$ applicable to each aspheric surface in embodiment 4. Wherein the surface shape of each aspheric surface can be defined by the formula (1) given in the above embodiment 1.

TABLE 10

| | Parameter | | | | |
|---|---|---|---|---|---|
| | ImgH (mm) | f (mm) | f1 (mm) | f2 (mm) | TTL (mm) |
| Value | 1.425 | 4.300 | 3.391 | −4.925 | 4.071 |

TABLE 11

| Surface number | Surface type | Radius of curvature | Thickness | Material Refractive index | Abbe number | Conic coefficient |
|---|---|---|---|---|---|---|
| OBJ | spherical | infinite | 260.0000 | | | |
| STO | spherical | infinite | −0.3615 | | | |
| S1 | aspheric | 1.3123 | 0.7916 | 1.537 | 56.11 | 0.5520 |
| S2 | aspheric | 3.7105 | 0.6561 | | | −99.0000 |
| S3 | spherical | infinite | 0.2100 | 1.516 | 58.57 | |
| S4 | spherical | infinite | 0.8000 | | | |
| S5 | aspheric | −3.5534 | 0.5114 | 1.622 | 23.53 | −45.5350 |
| S6 | aspheric | 23.2536 | 1.1017 | | | −1.8281 |
| S7 | spherical | infinite | | | | |

TABLE 12

| Surface number | A4 | A6 | A8 | A10 | A12 | A14 | A16 |
|---|---|---|---|---|---|---|---|
| S1 | −2.5221E−02 | −9.7826E−02 | 3.2421E−01 | −7.2704E−01 | 7.4823E−01 | −3.2445E−01 | 0.0000E+00 |
| S2 | 2.6605E−01 | −5.5109E−01 | 1.2588E+00 | −1.6977E+00 | 1.2610E+00 | −3.0530E−01 | 0.0000E+00 |

TABLE 12-continued

| Surface number | A4 | A6 | A8 | A10 | A12 | A14 | A16 |
|---|---|---|---|---|---|---|---|
| S5 | −4.3725E−01 | −6.5982E−02 | 2.2449E−01 | −6.1107E−01 | −9.3589E−01 | 2.4207E+00 | −1.9553E+00 |
| S6 | −2.0613E−01 | −2.4560E−04 | 8.4813E−02 | −1.7428E−01 | 1.4766E−01 | −6.7932E−02 | 1.3761E−02 |

Figure 8A:
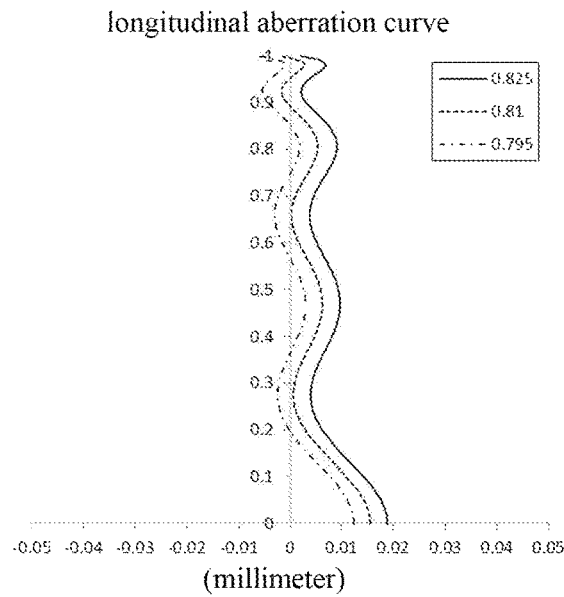
FIG. 8A illustrates a longitudinal aberration curve of the iris lens assembly according to embodiment 4.
Figure 8B:
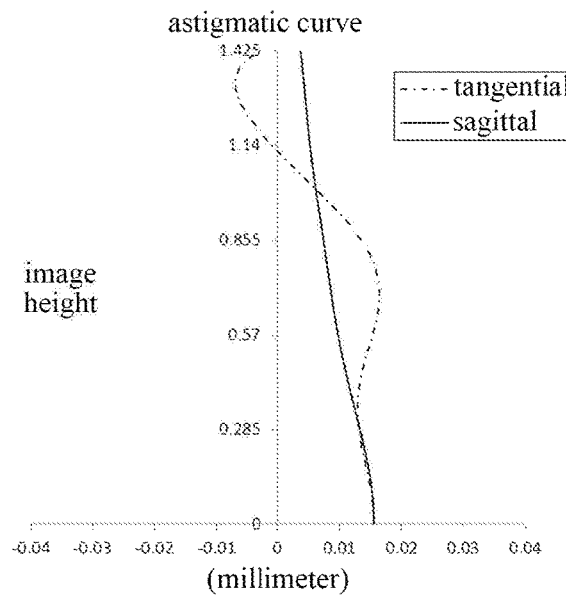
FIG. 8B illustrates an astigmatism curve of the iris lens assembly according to embodiment 4.
Figure 8C:
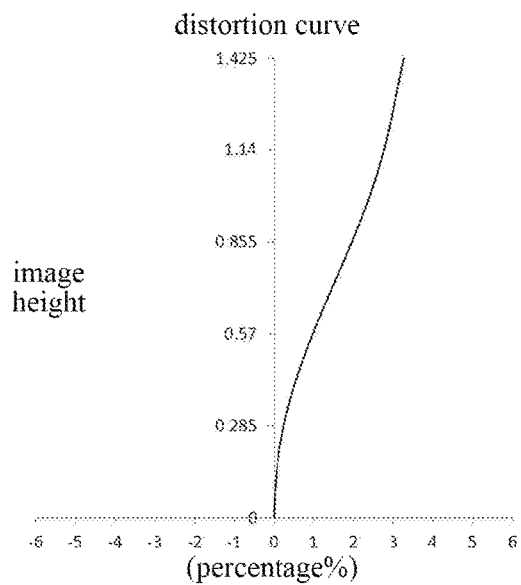
FIG. 8C illustrates a distortion curve of the iris lens assembly according to embodiment 4.
Figure 8D:
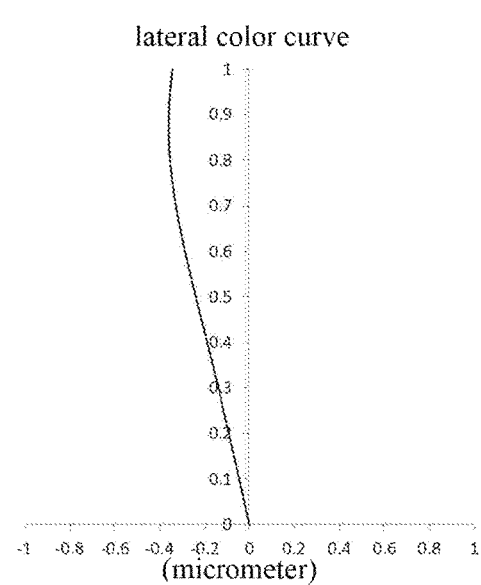
FIG. 8D illustrates a lateral color curve of the iris lens assembly according to embodiment 4.

FIG. 8A illustrates a longitudinal aberration curve of the iris lens assembly according to embodiment 4, representing deviations of focal points converged by light of different wavelengths after passing through the iris lens assembly. FIG. 8B illustrates an astigmatism curve of the iris lens assembly according to embodiment 4, representing a curvature of a tangential plane and a curvature of a sagittal plane. FIG. 8C illustrates a distortion curve of the iris lens assembly according to embodiment 4, representing amounts of distortion at different viewing angles. FIG. 8D illustrates a lateral color curve of the iris lens assembly according to embodiment 4, representing deviations of different image heights on an image plane after light passes through the iris lens assembly. It can be seen from FIG. 8A to FIG. 8D that the iris lens assembly provided in embodiment 4 can achieve good image quality.

Embodiment 5

Figure 9:
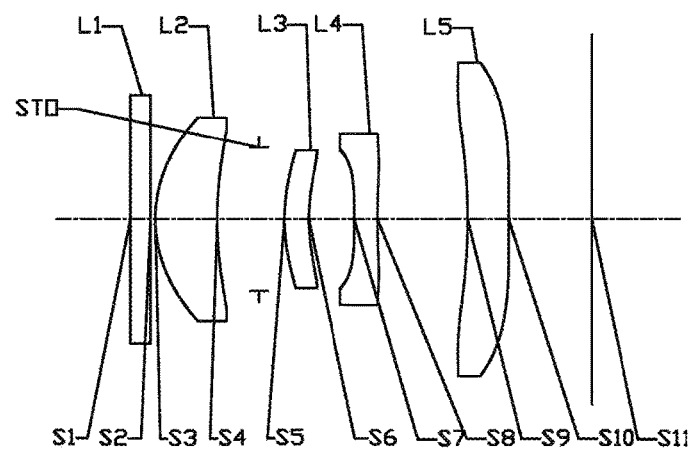
FIG. 9 is a schematic structural view of an iris lens assembly according to embodiment 5 of the present disclosure.

An iris lens assembly according to Embodiment 5 of the present disclosure is described below with reference to FIG. 9 to FIG. 10D. FIG. 9 shows a schematic structural view of the iris lens assembly according to embodiment 5.

As shown in FIG. 9, the iris lens assembly includes, sequentially from an object side to an image side along an optical axis: an optical filter L1 having an object-side surface S1 and an image-side surface S2; a first lens L2 having an object-side surface S3 and an image-side surface S4; a second lens L3 having an object-side surface S5 and an image-side surface S6; a third lens L4 having an object-side surface S7 and an image-side surface S8; and a fourth lens L5 having an object-side surface S9 and an image-side surface S10. Alternatively, a band-pass wavelength of the optical filter L1 is from about 700 nm to about 900 nm. Light from an object passes through the respective surfaces S1 to S10 sequentially and is finally imaged on the image plane S11.

Table 13 shows half of a diagonal length ImgH of an effective pixel area of the image plane S11 of the iris lens assembly, a total effective focal length f of the iris lens assembly, effective focal lengths f1 to f4 of each lens, and a distance TTL on the optical axis from the object-side surface S3 of the first lens L2 to the image plane S11 of the iris lens assembly. Table 14 shows surface type, radius of curvature, thickness, material and conic coefficient of each lens of the iris lens assembly in embodiment 5, wherein the units of the radius of curvature and the thickness are both millimeter (mm). Table 15 shows the high-order coefficients $A_4, A_6, A_8, A_{10}, A_{12}, A_{14}$ and $A_{16}$ applicable to each aspheric surface in embodiment 5. Wherein the surface shape of each aspheric surface can be defined by the formula (1) given in the above embodiment 1.

TABLE 13

| Parameter | ImgH (mm) | f (mm) | f1 (mm) | f2 (mm) | f3 (mm) | f4 (mm) | TTL (mm) |
|---|---|---|---|---|---|---|---|
| Value | 1.965 | 5.001 | 3.847 | 86.005 | −7.048 | −10.629 | 4.547 |

TABLE 14

| Surface number | Surface type | Radius of curvature | Thickness | Material Refractive index | Material Abbe number | Conic coefficient |
|---|---|---|---|---|---|---|
| OBJ | spherical | infinite | 260.0000 | | | |
| S1 | spherical | infinite | 0.2100 | 1.516 | 58.57 | |
| S2 | spherical | infinite | 0.0500 | | | |
| S3 | aspheric | 1.4406 | 0.6444 | 1.537 | 56.11 | −0.0472 |
| S4 | aspheric | 4.0190 | 0.4342 | | | −22.1000 |
| STO | spherical | infinite | 0.2667 | | | |
| S5 | aspheric | 2.0233 | 0.2539 | 1.537 | 56.11 | 0.1442 |
| S6 | aspheric | 2.0232 | 0.4771 | | | 0.4237 |
| S7 | aspheric | −20.6784 | 0.2415 | 1.622 | 23.53 | 1.0000 |
| S8 | aspheric | 5.5811 | 0.9394 | | | −23.9098 |
| S9 | aspheric | −6.9237 | 0.4265 | 1.537 | 56.11 | 1.0000 |
| S10 | aspheric | 33.1379 | 0.8636 | | | −99.0000 |
| S11 | spherical | infinite | | | | |

TABLE 15

| Surface number | A4 | A6 | A8 | A10 | A12 | A14 | A16 |
|---|---|---|---|---|---|---|---|
| S3 | −9.6548E−03 | −1.5315E−02 | 1.9948E−02 | −3.4751E−02 | 2.3348E−02 | −8.2450E−03 | 0.0000E+00 |
| S4 | 3.2298E−02 | −4.0423E−02 | 3.7414E−02 | −3.8987E−02 | 2.0025E−02 | −5.1452E−03 | 0.0000E+00 |
| S5 | −7.0031E−02 | −1.3513E−01 | 6.8709E−01 | −1.5674E+00 | 1.9141E+00 | −9.5355E−01 | 0.0000E+00 |
| S6 | −1.4729E−01 | −1.4560E−01 | 6.0604E−01 | −1.6617E+00 | 2.2517E+00 | −1.3353E+00 | 0.0000E+00 |
| S7 | −3.1556E−01 | −2.8172E−01 | 5.1999E−01 | −1.6965E+00 | 2.4775E+00 | −1.8301E+00 | 0.0000E+00 |
| S8 | −1.2571E−01 | −4.1381E−02 | 1.2638E−01 | 9.1866E−03 | −7.3151E−02 | 2.9401E−02 | 0.0000E+00 |
| S9 | −3.5227E−02 | 4.8773E−02 | −1.8465E−02 | 3.4981E−03 | −3.4462E−04 | 1.6716E−05 | −3.1553E−07 |
| S10 | −7.1113E−02 | 2.5238E−02 | −8.3363E−03 | 1.2339E−03 | −9.1330E−05 | 3.4679E−06 | −5.5075E−08 |

Figures 10A, 10B:
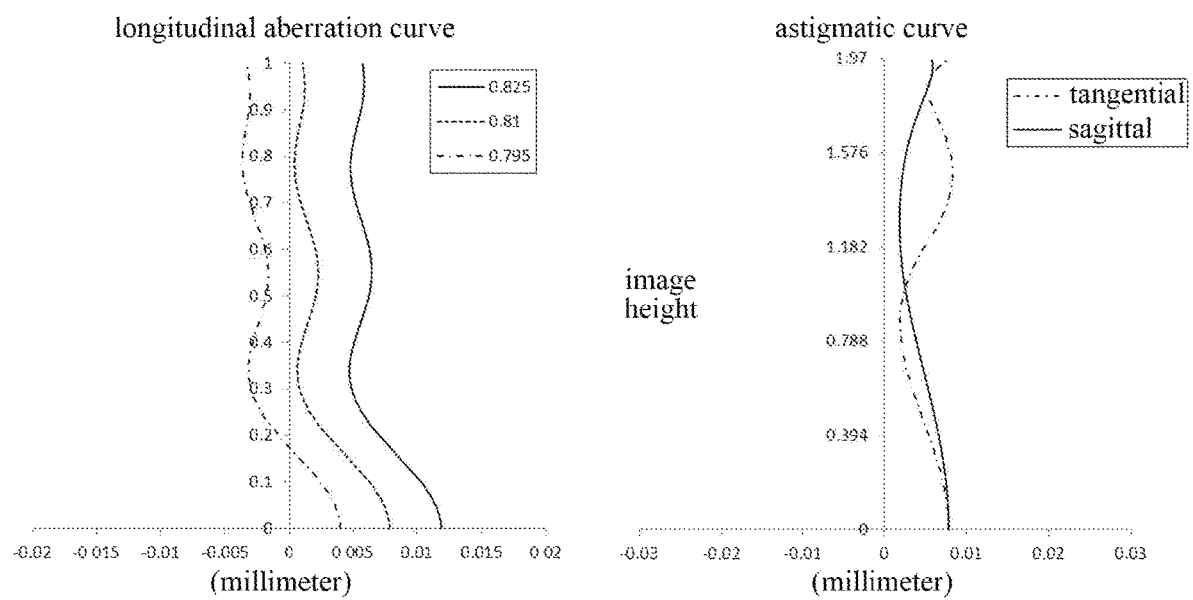
FIG. 10A illustrates a longitudinal aberration curve of the iris lens assembly according to embodiment 5.
FIG. 10B illustrates an astigmatism curve of the iris lens assembly according to embodiment 5.

FIG. 10A illustrates a longitudinal aberration curve of the iris lens assembly according to embodiment 5, representing deviations of focal points converged by light of different wavelengths after passing through the iris lens assembly. FIG. 10B illustrates an astigmatism curve of the iris lens assembly according to embodiment 5, representing a curvature of a tangential plane and a curvature of a sagittal plane. FIG. 10C illustrates a distortion curve of the iris lens assembly according to embodiment 5, representing amounts of distortion at different viewing angles. FIG. 10D illustrates a lateral color curve of the iris lens assembly according to embodiment 5, representing deviations of different image heights on an image plane after light passes through the iris lens assembly. It can be seen from FIG. 10A to FIG. 10D that the iris lens assembly provided in embodiment 5 can achieve good image quality.

Embodiment 6

An iris lens assembly according to embodiment 6 of the present disclosure is described below with reference to FIG. 11 to FIG. 12D. FIG. 11 shows a schematic structural view of the iris lens assembly according to embodiment 5.

As shown in FIG. 11, the iris lens assembly includes, sequentially from an object side to an image side along an optical axis: a diaphragm STO; a first lens L1 having an object-side surface S1 and an image-side surface S2; an optical filter L2 having an object-side surface S3 and an image-side surface S4; a second lens L3 having an object-side surface S5 and an image-side surface S6; a third lens L4 having an object-side surface S7 and an image-side surface S8; and a fourth lens L5 having an object-side surface S9 and an image-side surface S10. Alternatively, a band-pass wavelength of the optical filter L2 is from about 700 nm to about 900 nm. Light from an object passes through the respective surfaces S1 to S10 sequentially and is finally imaged on the image plane S11.

Table 16 shows half of a diagonal length ImgH of an effective pixel area on the image plane S11 of the iris lens assembly, a total effective focal length f of the iris lens assembly, effective focal lengths f1 to f4 of each lens, and a distance TTL on the optical axis from the object-side surface S1 of the first lens L1 to the image plane S11 of the iris lens assembly. Table 17 shows surface type, radius of curvature, thickness, material and conic coefficient of each lens of the iris lens assembly in embodiment 6, wherein the units of the radius of curvature and the thickness are both millimeter (mm). Table 18 shows the high-order coefficients $A_4, A_6, A_8, A_{10}, A_{12}, A_{14}$ and $A_{16}$ applicable to each aspheric surface in embodiment 6. Wherein the surface shape of each aspheric surface can be defined by the formula (1) given in the above embodiment 1.

TABLE 16

| Parameter | ImgH (mm) | f (mm) | f1 (mm) | f2 (mm) | f3 (mm) | f4 (mm) | TTL (mm) |
|---|---|---|---|---|---|---|---|
| Value | 1.965 | 4.999 | 3.880 | 7301.519 | −9.766 | −8.664 | 4.611 |

TABLE 17

| Surface number | Surface type | Radius of curvature | Thickness | Material Refractive index | Material Abbe number | Conic coefficient |
|---|---|---|---|---|---|---|
| OBJ | spherical | infinite | 260.0000 | | | |
| S1 | aspheric | 1.4609 | 0.5819 | 1.537 | 56.11 | −0.0487 |
| S2 | aspheric | 4.2114 | 0.3428 | | | −23.0644 |
| S3 | spherical | infinite | 0.0000 | | | |
| S4 | spherical | infinite | 0.2100 | 1.517 | 64.17 | |
| STO | spherical | infinite | 0.2537 | | | |
| S5 | aspheric | 2.0368 | 0.2451 | 1.537 | 56.11 | 0.2387 |
| S6 | aspheric | 1.9522 | 0.4612 | | | 0.2851 |
| S7 | aspheric | −45.8489 | 0.2300 | 1.622 | 23.53 | −99.0000 |
| S8 | aspheric | 7.0068 | 1.0063 | | | −51.8894 |
| S9 | aspheric | −6.1567 | 0.3404 | 1.537 | 56.11 | 0.3469 |
| S10 | aspheric | 19.3870 | 0.9397 | | | −99.0000 |
| S11 | spherical | infinite | | | | |

TABLE 18

| Surface number | A4 | A6 | A8 | A10 | A12 | A14 | A16 |
|---|---|---|---|---|---|---|---|
| S3 | −9.3682E−03 | −1.5050E−02 | 2.0087E−02 | −3.4665E−02 | 2.3297E−02 | −8.4544E−03 | 0.0000E+00 |
| S4 | 3.0524E−02 | −4.3324E−02 | 5.8698E−02 | −7.3703E−02 | 4.5790E−02 | −1.2552E−02 | 0.0000E+00 |
| S5 | −6.9561E−02 | −1.2568E−01 | 6.8672E−01 | −1.5510E+00 | 1.9149E+00 | −9.5355E−01 | 0.0000E+00 |
| S6 | −1.4886E−01 | −1.5506E−01 | 6.4121E−01 | −1.6722E+00 | 2.2517E+00 | −1.3353E+00 | 0.0000E+00 |
| S7 | −3.1272E−01 | −2.7313E−01 | 5.0193E−01 | −1.6028E+00 | 2.4775E+00 | −1.8301E+00 | 0.0000E+00 |
| S8 | −1.3799E−01 | −4.8653E−02 | 1.3778E−01 | 2.9941E−02 | −6.2602E−02 | 9.9073E−03 | 0.0000E+00 |
| S9 | −9.4001E−02 | 6.4315E−02 | −1.7349E−02 | 2.5649E−03 | −2.0970E−04 | 8.7540E−06 | −1.4507E−07 |
| S10 | −1.1850E−01 | 4.5305E−02 | −1.5789E−02 | 2.6740E−03 | −2.3106E−04 | 1.0233E−05 | −1.8742E−07 |

Figure 12A:
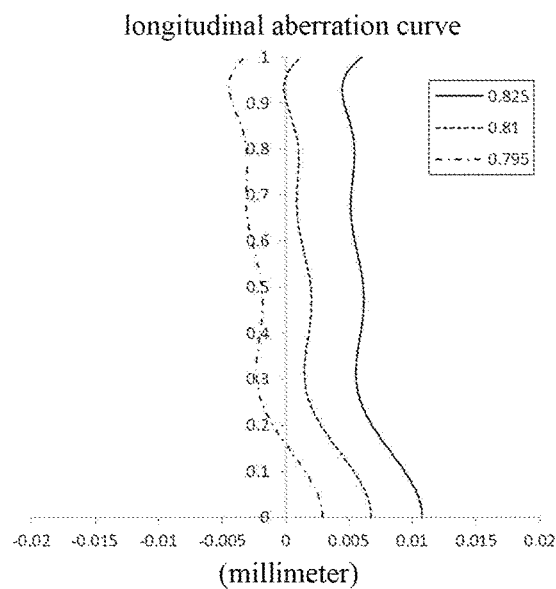
FIG. 12A illustrates a longitudinal aberration curve of the iris lens assembly according to embodiment 6.
Figure 12B:
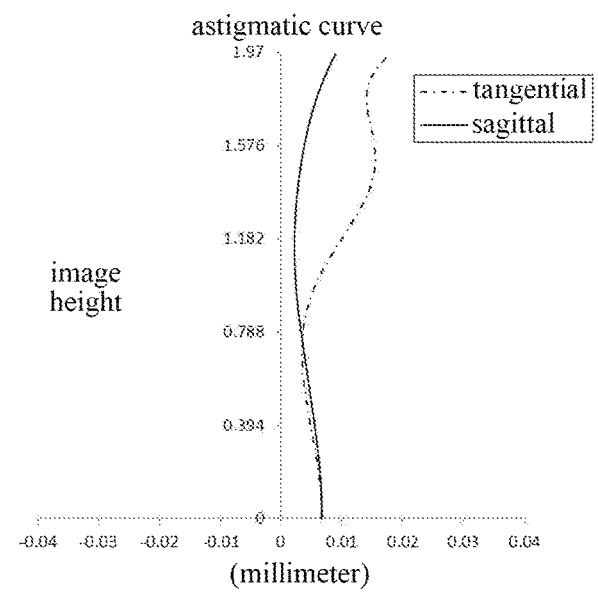
FIG. 12B illustrates an astigmatism curve of the iris lens assembly according to embodiment 6.
Figure 12C:
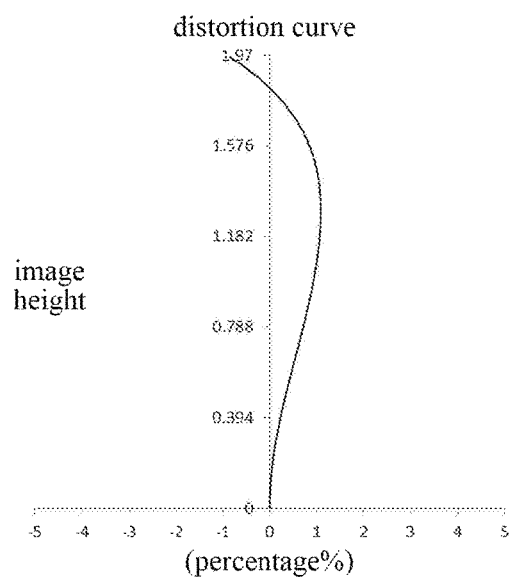
FIG. 12C illustrates a distortion curve of the iris lens assembly according to embodiment 6.
Figure 12D:
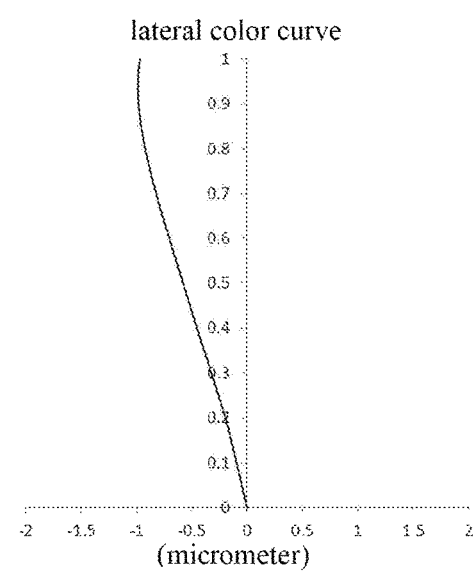
FIG. 12D illustrates a lateral color curve of the iris lens assembly according to embodiment 6.

FIG. 12A illustrates a longitudinal aberration curve of the iris lens assembly according to embodiment 6, representing deviations of focal points converged by light of different wavelengths after passing through the iris lens assembly. FIG. 12B illustrates an astigmatism curve of the iris lens assembly according to embodiment 6, representing a curvature of a tangential plane and a curvature of a sagittal plane. FIG. 12C illustrates a distortion curve of the iris lens assembly according to embodiment 6, representing amounts of distortion at different viewing angles. FIG. 12D illustrates a lateral color curve of the iris lens assembly according to embodiment 6, representing deviations of different image heights on an image plane after light passes through the iris lens assembly. It can be seen from FIG. 12A to FIG. 12D that the iris lens assembly provided in embodiment 6 can achieve good image quality.

Embodiment 7

Figure 13:
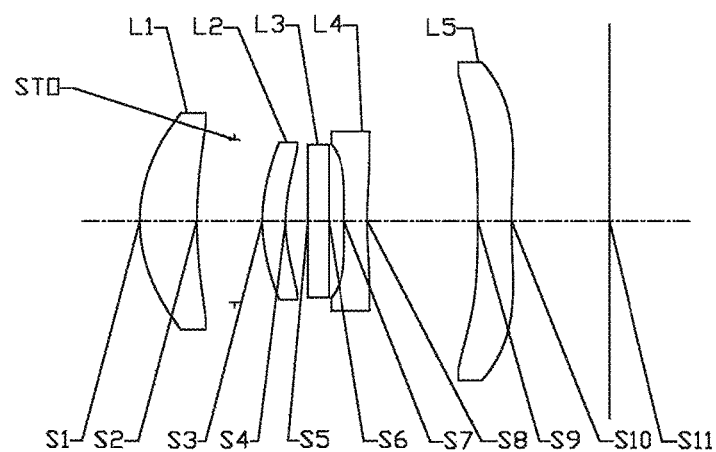
FIG. 13 is a schematic structural view of an iris lens assembly according to embodiment 7 of the present disclosure.

An iris lens assembly according to embodiment 7 of the present disclosure is described below with reference to FIG. 13 to FIG. 14D. FIG. 13 shows a schematic structural view of the iris lens assembly according to embodiment 7.

As shown in FIG. 13, the iris lens assembly includes, sequentially from an object side to an image side along an optical axis: a first lens L1 having an object-side surface S1 and an image-side surface S2; a diaphragm STO; a second lens L2 having an object-side surface S3 and an image-side surface S4; an optical filter L3 having an object-side surface S5 and an image-side surface S6; a third lens L4 having an object-side surface S7 and an image-side surface S8; and a fourth lens L5 having an object-side surface S9 and an image-side surface S10. Alternatively, a band-pass wavelength of the optical filter L3 is from about 700 nm to about 900 nm. Light from an object passes through the respective surfaces S1 to S10 sequentially and is finally imaged on the image plane S11.

Table 19 shows half of a diagonal length ImgH of an effective pixel area on the image plane S11 of the iris lens assembly, a total effective focal length f of the iris lens assembly, effective focal lengths f1 to f4 of each lens, and a distance TTL on the optical axis from the object-side surface S1 of the first lens L1 to the image plane S11 of the iris lens assembly. Table 20 shows surface type, radius of curvature, thickness, material and conic coefficient of each lenses of the iris lens assembly in embodiment 7, wherein the units of the radius of curvature and the thickness are both millimeter (mm). Table 21 shows the high-order coefficients $A_4$, $A_6$, $A_8$, $A_{10}$, $A_{12}$, $A_{14}$ and $A_{16}$ applicable to the each aspheric surface in embodiment 7. Wherein the surface shape of each aspheric surface can be defined by the formula (1) given in the above embodiment 1.

TABLE 19

| Parameter | ImgH (mm) | f (mm) | f1 (mm) | f2 (mm) | f3 (mm) | f4 (mm) | TTL (mm) |
|---|---|---|---|---|---|---|---|
| Value | 1.965 | 4.999 | 4.039 | 85.227 | −8.854 | −10.273 | 4.644 |

TABLE 20

| Surface number | Surface type | Radius of curvature | Thickness | Material | | Conic coefficient |
|---|---|---|---|---|---|---|
| | | | | Refractive index | Abbe number | |
| OBJ | spherical | infinite | 260.0000 | | | |
| S1 | aspheric | 1.5130 | 0.5634 | 1.537 | 56.11 | −0.0676 |
| S2 | aspheric | 4.3556 | 0.3726 | | | −30.3030 |
| STO | spherical | infinite | 0.2735 | | | |
| S3 | aspheric | 1.6329 | 0.2300 | 1.537 | 56.11 | −0.4709 |
| S4 | aspheric | 1.6101 | 0.2193 | | | −0.4833 |
| S5 | spherical | infinite | 0.2100 | 1.517 | 64.17 | |
| S6 | spherical | infinite | 0.1515 | | | |
| S7 | aspheric | 16.5939 | 0.2300 | 1.622 | 23.53 | −5.2386 |
| S8 | aspheric | 4.1098 | 1.0911 | | | −23.2504 |
| S9 | aspheric | −104.5114 | 0.3344 | 1.537 | 56.11 | −99.0000 |
| S10 | aspheric | 5.8282 | 0.9679 | | | −8.6807 |
| S11 | spherical | infinite | | | | |

TABLE 21

| Surface number | A4 | A6 | A8 | A10 | A12 | A14 | A16 |
|---|---|---|---|---|---|---|---|
| S1 | −1.0075E−02 | −1.5099E−02 | 1.9258E−02 | −3.4693E−02 | 2.3386E−02 | −8.3552E−03 | 0.0000E+00 |
| S2 | 2.8519E−02 | −4.7736E−02 | 5.7925E−02 | −6.7452E−02 | 4.0219E−02 | −1.1064E−02 | 0.0000E+00 |
| S3 | −8.5018E−02 | −1.2107E−01 | 7.0487E−01 | −1.5821E+00 | 1.9132E+00 | −9.5355E−01 | 0.0000E+00 |
| S4 | −1.7152E−01 | −1.2652E−01 | 6.1211E−01 | −1.6645E+00 | 2.2517E+00 | −1.3353E+00 | 0.0000E+00 |
| S7 | −3.1639E−01 | −2.3837E−01 | 5.0738E−01 | −1.5976E+00 | 2.4775E+00 | −1.8301E+00 | 0.0000E+00 |
| S8 | −1.3081E−01 | −4.5091E−02 | 1.4860E−01 | 2.4249E−02 | −8.9265E−02 | 2.9401E−02 | 0.0000E+00 |
| S9 | −1.1498E−01 | 5.3483E−02 | −1.0469E−02 | 1.0982E−03 | −6.3462E−05 | 1.8891E−06 | −2.2569E−08 |
| S10 | −1.2658E−01 | 4.3331E−02 | −1.4129E−02 | 2.3528E−03 | −2.0141E−04 | 8.8132E−06 | −1.5862E−07 |

Figures 14A, 14B:
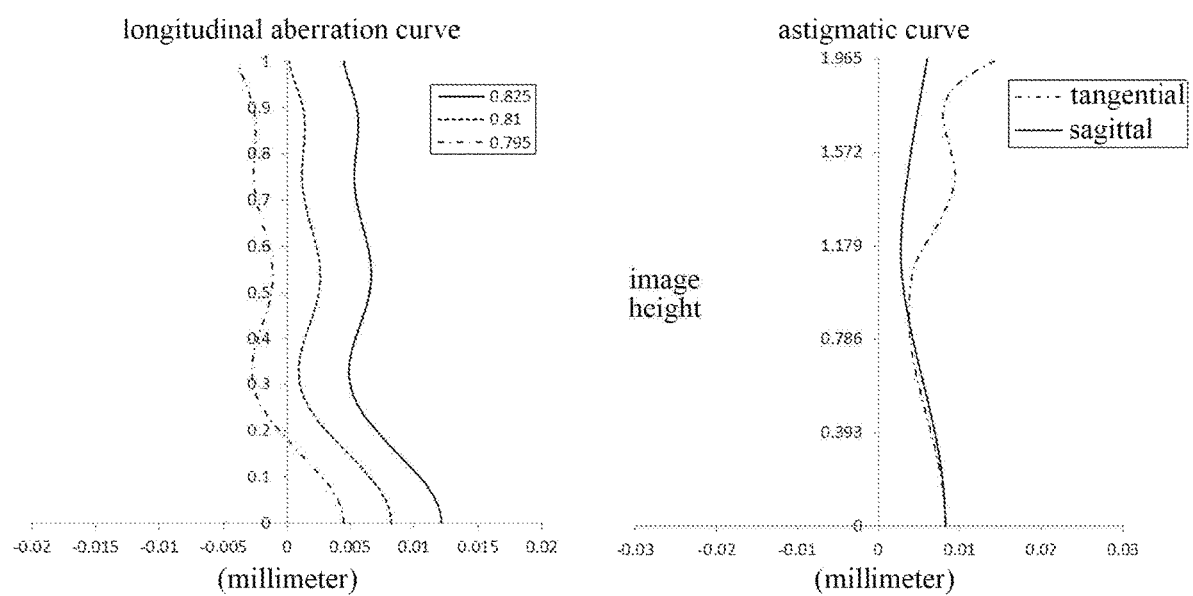
FIG. 14A illustrates a longitudinal aberration curve of the iris lens assembly according to embodiment 7.
FIG. 14B illustrates an astigmatism curve of the iris lens assembly according to embodiment 7.
Figure 14C:
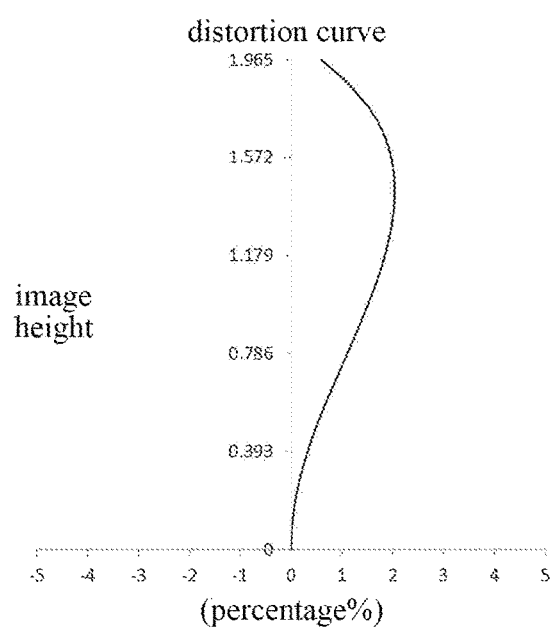
FIG. 14C illustrates a distortion curve of the iris lens assembly according to embodiment 7.
Figure 14D:
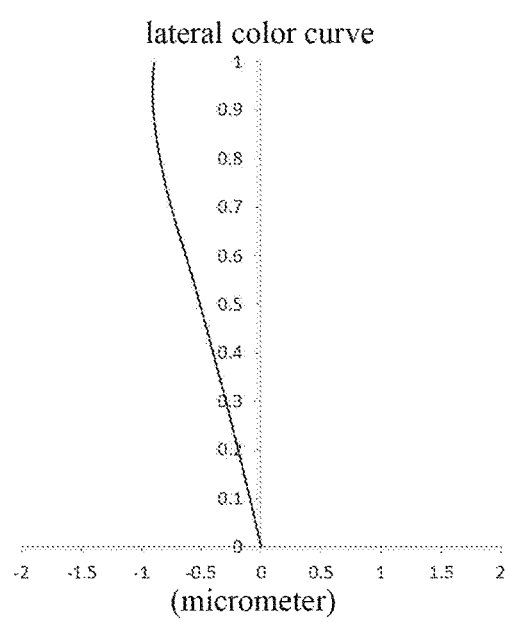
FIG. 14D illustrates a lateral color curve of the iris lens assembly according to embodiment 7.

FIG. 14A illustrates a longitudinal aberration curve of the iris lens assembly according to embodiment 7, representing deviations of focal points converged by light of different wavelengths after passing through the iris lens assembly. FIG. 14B illustrates an astigmatism curve of the iris lens assembly according to embodiment 7, representing a curvature of a tangential plane and a curvature of a sagittal plane. FIG. 14C illustrates a distortion curve of the iris lens assembly according to embodiment 7, representing amounts of distortion at different viewing angles. FIG. 14D illustrates a lateral color curve of the iris lens assembly according to embodiment 7, representing deviations of different image heights on an image plane after light passes through the iris lens assembly. It can be seen from FIG. 14A to FIG. 14D that the iris lens assembly provided in embodiment 7 can achieve good image quality.

In summary, embodiment 1 to embodiment 7 respectively satisfy the relationships shown in Table 22 below.

TABLE 22

| | Formula | | | | |
|---|---|---|---|---|---|
| Embodiment | f1/f | DT11/ImgH | ΣCT/TTL | CRAmax (°) | TTL/f |
| 1 | 0.662 | 0.602 | 0.380 | 30.334 | 0.875 |
| 2 | 0.646 | 0.614 | 0.337 | 30.071 | 0.892 |
| 3 | 0.807 | 0.650 | 0.315 | 23.676 | 0.936 |
| 4 | 0.789 | 0.652 | 0.320 | 24.215 | 0.947 |
| 5 | 0.769 | 0.550 | 0.344 | 27.242 | 0.909 |
| 6 | 0.776 | 0.550 | 0.303 | 28.267 | 0.922 |
| 7 | 0.808 | 0.550 | 0.292 | 27.294 | 0.929 |

The present disclosure further provides a camera device, having a photosensitive element which may be a photosensitive charge-coupled device (CCD) or complementary metal-oxide semiconductor (CMOS) element. The camera device may be an independent camera device such as a digital camera, or may be a camera module integrated in a mobile electronic device such as a mobile phone. The camera device is equipped with the camera lens assembly described above.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An iris lens assembly comprising, sequentially from an object side to an image side along an optical axis, a first lens and at least one subsequent lens, wherein
   a lens of the subsequent lens, which is closest to the image side and has a refractive power, has an object-side surface, wherein the object-side surface is concave at the optical axis, and
   the iris lens assembly further comprises an optical filter, the optical filter is disposed between the object side and the lens closest to the image side and having the refractive power, and a band-pass wavelength of the optical filter is from 700 nm to 900 nm.

2. The iris lens assembly according to claim 1, further comprising an electronic photosensitive component disposed on an image plane, wherein an effective radius DT11 of an object-side surface of the first lens, and half of a diagonal length ImgH of an effective pixel area of the electronic photosensitive component, satisfy: 0.4<DT11/ImgH<0.8.

3. The iris lens assembly according to claim 1, wherein the first lens has a positive refractive power, an object-side surface of the first lens is a convex surface, and an image-side surface of the first lens is a concave surface.

4. The iris lens assembly according to claim 1, wherein the lens closest to the image side and having the refractive power has a negative refractive power.

5. The iris lens assembly according to claim 1, wherein the at least one subsequent lens comprises a second lens disposed between the first lens and the image side, and
   the iris lens assembly further comprises a diaphragm, the diaphragm is disposed between the object side and the second lens.

6. The iris lens assembly according to claim 1, wherein an effective focal length f1 of the first lens, and a total effective focal length f of the iris lens assembly satisfy: 0.5<f1/f<1.

7. The iris lens assembly according to claim 6, wherein ΣCT and TTL satisfy: 0.2<ΣCT/TTL<0.5, ΣCT being a sum of center thicknesses of the first lens to the lens closest to the image side and having a refractive power on the optical axis, TTL being a distance on the optical axis from the object-side surface of the first lens to an image plane of the iris lens assembly.

8. The iris lens assembly according to claim 2, wherein a maximum chief ray angle CRAmax of a chief incident ray on the electronic photosensitive component, satisfies: CRAmax<32°.

9. The iris lens assembly according to claim 6, wherein TTL and f satisfy: TTL/f<1, TTL being a distance on the optical axis from the object-side surface of the first lens to an image plane of the iris lens assembly, f being the total effective focal length of the iris lens assembly.

10. The iris lens assembly according claim 2, wherein an effective focal length f1 of the first lens, and a total effective focal length f of the iris lens assembly satisfy: 0.5<f1/f<1.

11. The iris lens assembly according claim 3, wherein an effective focal length f1 of the first lens, and a total effective focal length f of the iris lens assembly satisfy: 0.5<f1/f<1.

12. The iris lens assembly according claim 4, wherein an effective focal length f1 of the first lens, and a total effective focal length f of the iris lens assembly satisfy: 0.5<f1/f<1.

13. The iris lens assembly according claim 5, wherein an effective focal length f1 of the first lens, and a total effective focal length f of the iris lens assembly satisfy: 0.5<f1/f<1.

\* \* \* \* \*